United States Patent
Kumawat et al.

(10) Patent No.: US 11,281,742 B2
(45) Date of Patent: Mar. 22, 2022

(54) INTERACTIVE AND SELECTIVE COLORING OF DIGITAL VECTOR GLYPHS

(71) Applicant: Adobe Inc., San Jose, CA (US)

(72) Inventors: Nirmal Kumawat, Dhoinda (IN); Praveen Kumar Dhanuka, Howrah (IN); Arushi Jain, Delhi (IN)

(73) Assignee: Adobe Inc., San Jose, CA (US)

(*) Notice: Subject to any disclaimer, the term of this patent is extended or adjusted under 35 U.S.C. 154(b) by 250 days.

(21) Appl. No.: 16/535,653

(22) Filed: Aug. 8, 2019

(65) Prior Publication Data

US 2021/0042381 A1 Feb. 11, 2021

(51) Int. Cl.
| | |
|---|---|
| G06F 17/00 | (2019.01) |
| G06F 16/957 | (2019.01) |
| G06T 7/90 | (2017.01) |
| G06T 15/00 | (2011.01) |
| G06F 16/958 | (2019.01) |
| G06F 9/30 | (2018.01) |

(52) U.S. Cl.
CPC ...... *G06F 16/9577* (2019.01); *G06F 9/30036* (2013.01); *G06F 16/958* (2019.01); *G06T 7/90* (2017.01); *G06T 15/005* (2013.01)

(58) Field of Classification Search
CPC .............. G06F 16/9577; G06F 16/958; G06F 9/30036; G06F 17/214; G06F 3/0482; G06F 3/04845; G06T 7/90; G06T 15/005; G06T 11/203; G06T 11/60; G09G 5/26
USPC ....................................................... 707/736
See application file for complete search history.

(56) References Cited

U.S. PATENT DOCUMENTS

| | | | |
|---|---|---|---|
| 9,146,907 B1* | 9/2015 | Joshi .................. | G06K 15/1827 |
| 2002/0130908 A1* | 9/2002 | Wilensky ................ | G06T 11/00 |
| | | | 715/863 |
| 2007/0200873 A1* | 8/2007 | Hsu ........................ | G06T 11/60 |
| | | | 345/629 |
| 2007/0229526 A1* | 10/2007 | Hsu ........................ | G06F 9/451 |
| | | | 345/581 |
| 2008/0068383 A1* | 3/2008 | Dowling ............... | G06T 11/206 |
| | | | 345/441 |

(Continued)

OTHER PUBLICATIONS

Rainer Erich Scheichelbauer, Creating a Microsoft Color Font (CPAL/COLR), https://glyphsapp.com/tutorials/creating-a-microsoft-color-font, Oct. 23, 2014.

*Primary Examiner* — Jason T Edwards
(74) *Attorney, Agent, or Firm* — Keller Jolley Preece

(57) ABSTRACT

Methods, systems, and non-transitory computer readable storage media are disclosed for selectively modifying live digital vector glyphs. For example, the disclosed system can use a vector description of a live vector glyph having a plurality of regions defined by a plurality of paths to determine a vector document object model including style information for the paths. The disclosed system can extract a color for a selected region from the style information for the paths (e.g., from a stylesheet) and then change the extracted color to a selected color. After modifying the color, the disclosed system can then generate an updated vector description with the modified region color and render the updated live vector glyph at a client device. The disclosed system thus updates the live vector glyph while maintaining the glyph as a live glyph.

20 Claims, 13 Drawing Sheets

(56) References Cited

U.S. PATENT DOCUMENTS

2012/0092340 A1* 4/2012 Sarnoff ............... G06T 11/203
  345/420
2017/0293592 A1* 10/2017 He ..................... G06F 40/106
2018/0253878 A1* 9/2018 Jain .................... G06T 11/60

* cited by examiner

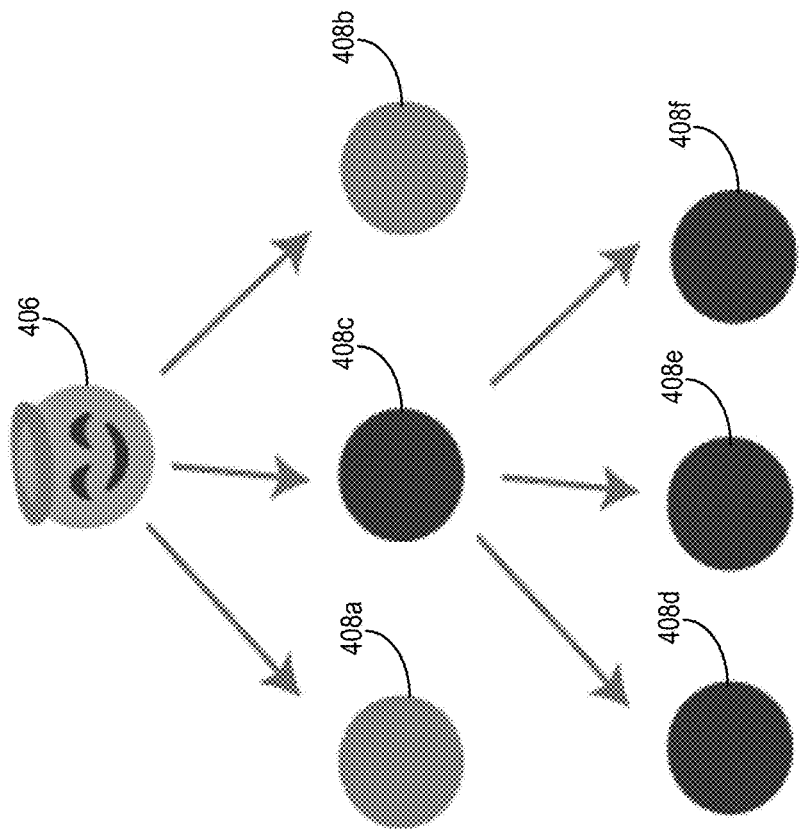
*Fig. 4D*
| S. No | Path ID | Color |
|---|---|---|
| 1. | Path 1 | Blue |
| 2. | Path 2 | Green |
| 3. | Path 3 | Brown |
| 4. | Path 4 | Brown |
| 5. | Path 5 | Brown |
*Fig. 4C*
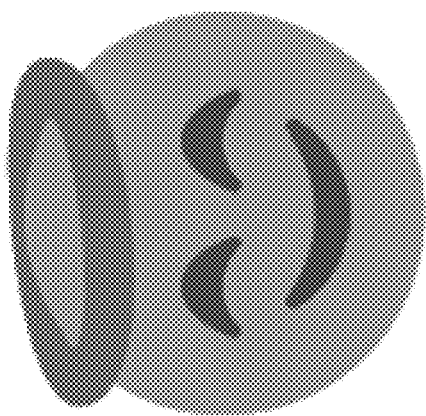
*Fig. 4E*

INTERACTIVE AND SELECTIVE COLORING OF DIGITAL VECTOR GLYPHS

BACKGROUND

Digital typography is widely prevalent in many types of digital content ranging from professional uses such as digital marketing to non-professional uses including flyers and invitations. In particular, vector-based graphics are a frequently used format for rendering text/glyphs to allow content creators to generate high quality digital typography without quality loss that other types of formats experience. For example, vector-based graphics provide lossless scaling and compression of glyphs by storing the geometric arrangement of the individual glyphs.

Adding color to digital content also allows content creators to provide greater detail and variety in their content. Many conventional digital content editing systems provide colorized versions of glyphs with color schemes that include a predetermined set of one or more colors in the glyphs (e.g., color palettes, often referred to as "CPAL" or a "CPAL table"). Some conventional systems also allow users to convert glyphs to editable outlines for changing the colors of the glyphs. Other conventional systems allow users to modify a non-color text glyph with a single path to set a color for the entire text glyph. Although these conventional systems allow for modifying colors of text or other glyphs, such systems lack flexibility and efficiency because converting the glyphs to outlines changes the glyphs so that they are no longer live (i.e., so that users can no longer add, remove, or modify text or glyphs in the same text/glyph field), and because modifying a non-color text glyph using conventional systems applies a color to the entire text glyph.

Thus, there are several technological shortcomings with regard to conventional digital content editing systems.

SUMMARY

One or more embodiments provide benefits and/or solve one or more of the foregoing or other problems in the art with systems, methods, and non-transitory computer readable storage media that provide selective coloring of live digital vector glyphs. In particular, the disclosed systems can interactively modify individual regions of live vector glyphs (e.g., using a color dropper tool). The disclosed systems can map color changes to other live vector glyphs in a digital document. Moreover, the disclosed systems can add texture, gradients, or images within different regions of live vector glyphs, even for live vector glyphs originally created without color. In some embodiments, the disclosed systems can implement these modifications while maintaining the functionality of live vector glyphs within digital documents and without the need for a CPAL table (e.g., the disclosed systems can flexibly change colors for fonts that do not include a CPAL table).

For example, in one or more embodiments, the disclosed systems use a vector description of a live vector glyph having a plurality of paths to determine a document object model including style information for the paths. The disclosed systems can extract a color associated with a path for an identified region of the glyph and then modify the color associated with the path. After modifying the color, the disclosed systems can generate an updated vector description and render the live vector glyph with the modified color. In this manner, the disclosed systems can flexibly and efficiently modify colors of vector glyphs while maintaining the glyphs as live vector glyphs.

Additional features and advantages of one or more embodiments of the present disclosure will be set forth in the following description.

BRIEF DESCRIPTION OF THE DRAWINGS

Various embodiments will be described and explained with additional specificity and detail through the use of the accompanying drawings in which:

FIGS. 4A-4E illustrate diagrams of a process for modifying a color of a region in a live vector glyph in accordance with one or more implementations;

DETAILED DESCRIPTION

Figure 1:
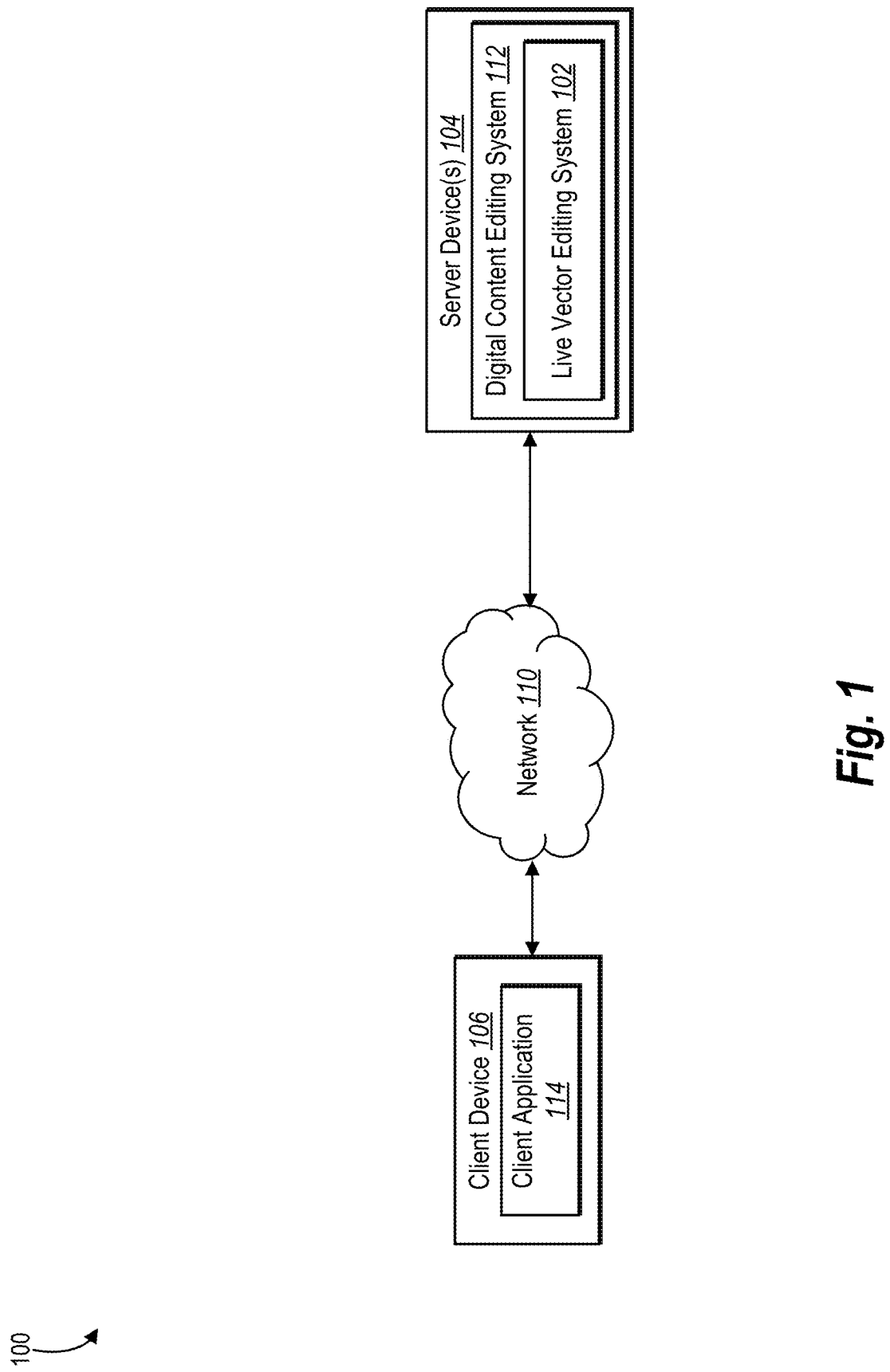
FIG. 1 illustrates an example environment in which a live vector editing system can operate in accordance with one or more implementations.

One or more embodiments of the present disclosure include a live vector editing system (also "vector editing system") that selectively modifies portions of live vector glyphs. For example, in some embodiments the vector editing system identifies a region of a live vector glyph based on a user input to modify a color of the region. The vector editing system can use the identified region to select a path and corresponding path information from a vector description of the live vector glyph. Additionally, in some embodiments the vector editing system extracts a color from the path style information corresponding to the path and then changes/sets the color associated with the path to a selected color. Moreover, the vector editing system can generate a new vector description for the live vector glyph with the selected color and render the updated live vector glyph on a display device.

As mentioned, the vector editing system can identify a region of a live vector glyph based on a user input. In one or more embodiments, the live vector glyph includes a plurality of regions defined by a plurality of paths (e.g., a path can encompass a portion of the live vector glyph). The vector editing system can identify one of the regions in the glyph based on a user input to apply a color to the selected region of the live vector glyph. For example, the vector editing system can use cursor hit detection or a color mapping interface to identify a specific region of the live vector glyph.

After identifying a region of a live vector glyph, the vector editing system can determine a path and path style information associated with a plurality of paths in the live vector glyph. In one or more embodiments, the vector editing system determines the path and path style information from a vector description corresponding to the live vector glyph. For instance, the vector editing system can parse the vector description to determine a document object model representation (e.g., a tree structure) of the live vector glyph. To illustrate, the vector editing system can determine a document object model representation that includes path style information for the plurality of paths of the live vector glyph based on path identifiers in the vector description.

In one or more embodiments, the vector editing system extracts a color for the region from the path style information. Specifically, the vector editing system can analyze the path style information for the plurality of paths to identify a color of the path corresponding to the region. For example, the color can be a fill color assigned to the region, which can be a portion of the live vector glyph defined by the corresponding path. Accordingly, the vector editing system can determine that the region has a specific color in a vector description by analyzing a document object model representation of the live vector glyph.

In response to extracting a color associated with a path, the vector editing system can modify the color to a selected color. For example, the vector editing system can replace a color stored in path style information associated with the path with a color that a user has selected. In one or more embodiments, the vector editing system replaces the color for only the selected path in a single live vector glyph. In one or more additional embodiments, the vector editing system maps the identified color to the selected color across a plurality of live vector glyphs. In this manner, the vector editing system can change colors for individual regions of historical or future live vector glyphs utilized within a digital document.

Additionally, the vector editing system can provide user interface tools for manual selection of individual regions of live vector glyphs or for modifying a theme of a plurality of live vector glyphs. For instance, the vector editing system can allow a user to select a color and apply the color to a region with the use of a user interface tool (e.g., a color dropper tool). Additionally, the vector editing system can provide a user interface tool to modify a plurality of regions simultaneously by remapping one or more colors in a color theme for live vector glyphs to one or more other colors.

As mentioned above, conventional content editing systems have a number of shortcomings in relation to flexibility and efficiency of operation. For example, some conventional digital content editing systems modify colors of vector glyphs by utilizing color palette ("CPAL") tables stored with the glyphs. While CPAL tables provide colors corresponding to regions of vector glyphs (e.g., text fonts) that are modifiable, conventional systems that utilize CPAL tables to modify color glyphs are unable to modify vector glyphs that do not have CPAL tables included. Additionally, changing a color in a CPAL table results in modifying every region that has that color. This results in a limited set of font customizations available to content editors/creators via the conventional systems.

Some conventional systems attempt to address the limitations of CPAL tables by determining outline information associated with vector glyphs. Specifically, conventional systems convert live vector glyphs into outlines with associated color information. By converting the live vector glyphs into outlines, however, the conventional systems remove the ability to edit the glyphs as live vector glyphs. For instance, when a user modifies colors of a live vector glyph that the user previously inserted using conventional systems, the vector glyph stops being live such that the user can no longer insert new glyphs in the same field or otherwise manipulate the glyph as live text (e.g., change the font size, modify the font style, or implement other live glyph modification features).

Furthermore, conventional systems cannot accurately identify colors from live vector glyphs. In particular, conventional systems typically require a user to convert a text glyph to outlines to be able to use color detection tools (e.g., a color dropper tool) for selecting a color from the text glyph. Accordingly, the conventional systems do not provide a way for users to easily select a color from a live vector glyph without first converting the live vector glyph to an outline, thus removing the ability to retain the vector glyph as a live vector glyph.

The disclosed live vector editing system provides a number of advantages over conventional systems. For example, the vector editing system improves the flexibility of a device or system that provides digital content editing of vector images. Specifically, the vector editing system improves flexibility by modifying colors for live vector glyphs having a plurality of paths using path style information. For instance, by allowing users to make modifications to individual regions of live vector glyphs while maintaining the glyphs as live glyphs (e.g., as text in text fields), the vector editing system can provide flexibility to users for generating and editing any live vector glyph. Additionally, the vector editing system can flexibly allow users to map colors in one or more regions of a plurality of live vector glyphs (e.g., previously entered glyphs and glyphs added later within the same field) to new colors. Moreover, the vector editing system provides the flexibility of adding textures, images, or images within regions of live vector glyphs.

The vector editing system can also improve efficiency of a vector glyph editing process by allowing users to modify individual paths/regions in vector glyphs with a plurality of paths. In particular, the vector editing system improves efficiency by maintaining live vector glyphs as live glyphs using path style information from document object models for the vector glyphs. To illustrate, by maintaining live vector glyphs as live glyphs while modifying colors of the glyphs, the vector editing system allows users to quickly edit colors of the live vector glyphs and also enter, delete, or modify glyphs utilizing live vector glyph tools.

As illustrated by the foregoing discussion, the present disclosure utilizes a variety of terms to describe features and advantages of the live vector editing system. Additional detail is now provided regarding the meaning of such terms. For example, as used herein, the term "live vector glyph" refers to a vector-based glyph. Specifically, a live vector glyph can include a text character, symbol, emoji, or other character that is part of a vector font set that can be entered into (and modified) as part of a text field (e.g., Unicode characters). Accordingly, the vector editing system can allow users to modify live vector glyphs within text fields by entering, deleting, and changing characteristics of the glyphs within the text fields while the glyphs are live.

As used herein, the term "path" refers to a line or vector in a vector-based image. For example, a path can include a vector that defines a shape in a text character. To illustrate, a live vector glyph can include a plurality of paths that define separate regions of the live vector glyph. Additionally, a path can include one or more segments connecting a plurality of lines (e.g., straight or curved lines) at vertices at different location along the path.

Additionally, as used herein, the term "region" refers to a portion of a vector glyph associated with a path of the vector glyph. For instance, a region can include an area of a vector glyph inside (and including) a path corresponding to the region. Accordingly, a vector glyph can include a plurality of regions corresponding to a plurality of paths. Furthermore, regions in a vector glyph can overlap, such that the vector editing system can determine which region to display to a user based on layering information (e.g., whether a given path/region is "in front of" or "behind" another path/region).

As used herein, the term "path style information" refers to data that defines one or more visual characteristics of a path in a vector-based image. For example, path style information can include color information for a path or a region corresponding to the path in a live vector glyph. To illustrate, path style information can define a fill color or a line color for rendering the path and/or a corresponding region on a display device. Path style information can also include line thickness data or other visual characteristics of a live vector glyph.

As used herein, the term "vector description" refers to a description of a vector-based image in a vector file. For example, a vector description can include a document markup of a vector-based image such as an XML-based markup in a vector image file. Accordingly, a vector description can include a description of a live vector glyph for rendering the live vector glyph on a display device.

As used herein, the term "vector document object model" refers to a document object model representation of a vector (e.g., obtained from a vector description). For instance, a vector document object model can include a tree structure with nodes representing paths of a vector-based image with path style information for each of the nodes. Accordingly, a vector document object model can include a tree structure with nodes including data indicating paths and colors for the paths.

Additional detail will now be provided regarding the live vector editing system in relation to illustrative figures portraying exemplary implementations. To illustrate, FIG. 1 includes an embodiment of a system environment (e.g., "environment") 100 of one or more memory devices and one or more processor devices in which a live vector editing system ("vector editing system") 102 operates in accordance with one or more embodiments. In particular, the environment 100 includes server device(s) 104 and a client device 106 communicating via a network 110. Moreover, as shown, the server device(s) 104 include a digital content editing system 112, which includes the vector editing system 102.

As shown in FIG. 1, the server device(s) 104 include the digital content editing system 112, which includes the vector editing system 102. In particular, the digital content editing system 112 can provide digital content to client devices for viewing, creating, editing, sharing, or otherwise interacting with the digital content. For instance, the digital content editing system 112 can provide digital content to the client device 106 for displaying the digital content at the client device 106. Additionally, the digital content editing system 112 can perform digital content editing operations to modify digital content for one or more client devices (including the client device 106). Accordingly, the digital content editing system 112 can modify digital content based on input from the client device 106 via the network 110 in real-time as a user utilize a client application 114 on the client device 106.

As part of the digital content editing system 112, the vector editing system 102 can assist in editing vector-based digital content. Specifically, the vector editing system 102 can provide creation and editing of vector glyphs including text from vector-based fonts. For example, the vector editing system 102 can provide a user interface for displaying vector-based digital content on the client device 106 and allowing a user to interact with the vector-based digital content. In response to a user interacting with the digital content via the client application 114 (e.g., in a web-based client application), the vector editing system 102 can determine one or more operations to perform to modify the digital content at the server device(s) 104. To illustrate, the vector editing system 102 can allow a user to change colors of regions of live text glyphs using the client application 114. The vector editing system 102 can then provide the modified digital content to the client device 106.

In one or more embodiments, the vector editing system 102 includes a font engine for rendering live vector glyphs at the client device 106. For instance, the font engine can provide path information to the client device 106 and other details about a font so that the client device 106 can accurately render live text glyphs of the corresponding font. According to one or more embodiments, the font engine parses vector descriptions of live text glyphs to obtain vector document object models of the live vector glyphs. The vector editing system 102 can then use the vector document object models to apply changes to path style information for paths in the live vector glyphs.

In one or more alternative embodiments, the font engine provides the vector descriptions to the client application 114 on the client device 106. The client application 114 can then parse the vector descriptions to obtain the vector document object models and apply changes to the path style information. The client application 114 can cause the client device 106 to provide the updated vector descriptions to the vector editing system 102 via the network 110 to render the modified live vector glyphs.

The client device 106 can include, but is not limited to, a mobile device (e.g., smartphone or tablet), a laptop, a desktop, including those explained below with reference to FIG. 9. Furthermore, although not shown in FIG. 1, the client device 106 can be operated by a user to perform a variety of functions. In particular, the client device 106 can perform functions such as, but not limited to, creating, storing, uploading, downloading, viewing, and/or modifying a variety of digital content (e.g., text documents, digital videos, digital audio, and/or digital images). For example, the client device 106 can communicate with the server device(s) 104 via the network 112 to provide and/or receive vector-based digital content to and/or from the server device(s) 104. Additionally, the client device 106 can interact with digital content, modify digital content, and/or communicate with the vector editing system 102 to modify digital content. Although FIG. 1 illustrates the environment 100 with a single client device 106, the environment 100 can include any number of client devices.

Additionally, as shown in FIG. 1, the environment 100 includes the network 110. The network 110 can enable communication between components of the environment 100. In one or more embodiments, the network 110 may include the Internet or World Wide Web. The network 110 can include various types of networks. Indeed, the server device(s) 104 and the client device 106 may communicate using any communication platforms and technologies suitable for transporting data and/or communication signals, including any known communication technologies, devices, media, and protocols supportive of data communications, examples of which are described with reference to FIG. 12.

Although FIG. 1 illustrates the server device(s) 104 and the client device 106 communicating via the network 112, the various components of the environment 100 can communicate and/or interact via other methods (e.g., the server device(s) 104 and the client device 106 can communicate directly). Furthermore, although FIG. 1 illustrates the vector editing system 102 being implemented by a particular component and/or device within the environment 100, the vector editing system 102 can be implemented, in whole or in part, by other computing devices and/or components in the environment 100. For instance, the vector editing system 102 can be implemented on the client device 106 to create and modify live vector glyphs without connecting to any other systems or devices.

Figure 2:
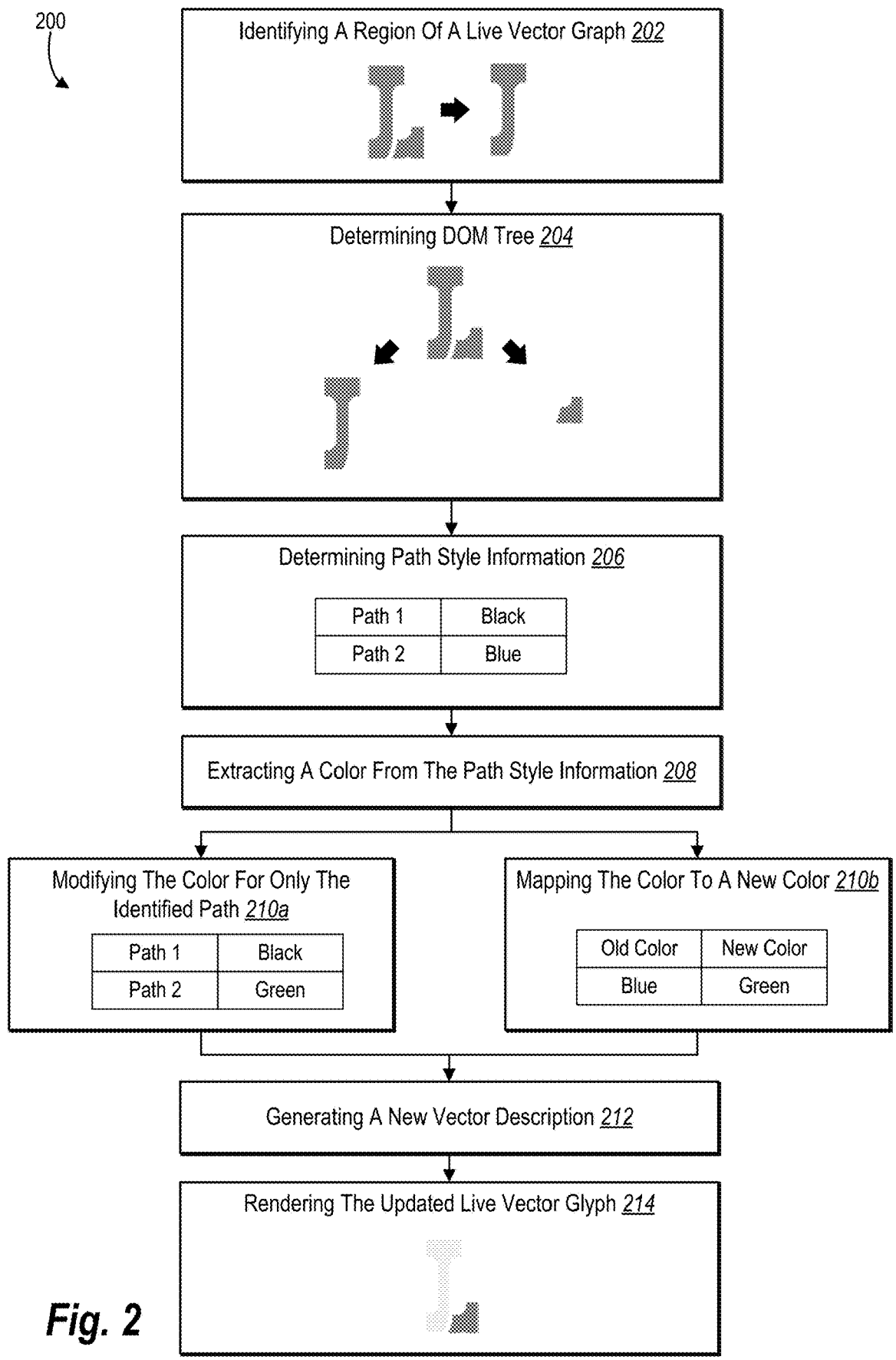
FIG. 2 illustrates a diagram of a process for modifying a color of a region in a live vector glyph in accordance with one or more implementations.

As mentioned above, the vector editing system 102 can modify path style information for live vector glyphs. FIG. 2 illustrates an overview of a process for modifying a color of a region in a live vector glyph in accordance with one or more embodiments. Specifically, in relation to FIG. 2, the vector editing system 102 analyzes data for rendering a live vector glyph to determine path style information for paths in the live vector glyph. The vector editing system 102 modifies the path data according to a selected color (e.g., based on a user input), and then updates the path style information. The vector editing system 102 can then render the modified live vector glyph on a display of the client device.

For example, as shown in FIG. 2, the vector editing system 102 performs a series of acts 200 that includes an act 202 of identifying a region of a live vector graph. In particular, the vector editing system 102 can identify a region of a live vector glyph based on a selection by a user. To illustrate, the vector editing system 102 can detect that a user has selected an area inside a path of the live vector glyph via a client application at a client device of the user. In one or more embodiments, the vector editing system 102 uses hit detection to determine that a user has clicked within a region defined by a specific path. Alternatively, the vector editing system 102 can determine a region based on the region having a color that the user has selected to change to another color (e.g., across a plurality of live vector glyphs).

In one or more embodiments, the series of acts 200 includes an act 204 of determining a document object model tree. As mentioned, a live vector glyph can include a vector description that causes a client device to render the live vector glyph on a display device. The vector description can include a document markup including data describing the live vector glyph such as an XML-based markup. To illustrate, the vector description can include code with data that allows the client device to render the live vector glyph including code that defines a plurality of paths in the live vector glyph such as stroke width, line color, and fill color.

The vector editing system 102 can parse the vector description to generate a document object model representing the live vector glyph. In particular, the vector editing system 102 can generate a document object model tree (also "DOM tree") by identifying each path in the live vector glyph and then determining path style information for each path. For instance, the vector editing system 102 can identify a path based on code that defines the path in document markup. The vector editing system 102 can then generate, or otherwise determine, a path identifier for the path for use in constructing the DOM tree.

The vector editing system 102 can also identify characteristics of the path based on the vector description to include in the DOM tree. For example, the vector editing system 102 can identify a color associated with the path. In one or more embodiments, the color associated with the path is a fill color for an area defined by (e.g., outlined by) the path in the live vector glyph. The vector editing system 102 can then assign the identified characteristic (e.g., fill color) to a node associated with the path in the DOM tree. The vector editing system 102 can similarly assign characteristics of every path in the live vector glyph to corresponding nodes for the paths in the DOM tree. After identifying the paths and assigning characteristics of the paths to the corresponding nodes, the vector editing system 102 can construct the DOM tree for the live vector glyph using the characteristics and path identifiers.

Additionally, although FIG. 2 illustrates identifying the region of the live vector graph prior to determining the DOM tree for the live vector glyph, the vector editing system 102 can alternatively identify the region at another time during the process. For instance, the vector editing system 102 can identify the region after determining the DOM tree for the live vector glyph. To illustrate, the vector editing system 102 can analyze each new vector glyph in a text field to determine a DOM tree for each glyph at the time the glyphs are entered into the text field.

The series of acts 200 also includes an act 206 of determining path style information. Specifically, the vector editing system 102 can determine the path style information for a live vector glyph based on the DOM tree constructed from the vector description. For example, by constructing the DOM tree, the vector editing system 102 can efficiently determine the path style information for each path in the live vector glyph to use in editing the live vector glyphs. More specifically, the vector editing system 102 can determine a plurality of mappings (e.g., in a stylesheet, table, or other structure) between path identifiers and characteristics of the paths (and regions corresponding to the paths) based on the DOM tree.

Additionally, the series of acts 200 includes an act 208 of extracting a color from the path style information. In particular, the vector editing system 102 can select path style information for the path corresponding to the identified region and then extract the color from the selected path style information. To illustrate, the vector editing system 102 can identify a mapping associated with the path based on a path identifier and then extract the color from path style information in the mapping. In one or more embodiments, the vector editing system 102 extracts a color fill corresponding to an area defined by the path and containing the identified region.

After the vector editing system 102 has extracted the color, the vector editing system 102 can modify the live vector glyph. For example, the series of acts 200 includes an act 210a of modifying the color for the identified path or an act 210b of mapping the color to a new color 210b. To modify the color for an identified path, the vector editing system 102 can access the path style information for the identified path. The vector editing system 102 can then replace the color stored in the path style information for the identified path. The path style information for other paths in the live vector glyph and other live vector glyphs can thus remain unchanged.

Alternatively, the vector editing system 102 can modify one or more other live vector glyphs in the same field as the live vector glyph based on a user input. For instance, the vector editing system 102 can map the color extracted from the path style information to a selected color. The vector editing system 102 can then store this mapping separately from the path style information and then use the mapping to replace each instance of the extracted color in one or more live style glyphs to the selected color. Thus, the vector editing system 102 can change the extracted color in additional existing live vector glyphs and newly entered live vector glyphs (e.g., after the user selects to change the color) to the selected glyph based on the mapping and without additional user input.

As shown in FIG. 2, the series of acts 200 includes an act 212 of generating a new vector description. In particular, once the vector editing system 102 has modified the color of the path in the path style information, the vector editing system 102 updates the vector description to include the changes. For instance, the vector editing system 102 can use the path style information to modify the DOM tree (e.g., by moving or changing one or more nodes in the DOM tree) based on the changed color. The vector editing system 102 can then use the DOM tree to generate a new vector description with the changes. To illustrate, the vector editing system 102 can update document markup for the live vector graphic to reflect the changes.

Finally, the series of acts 200 includes an act 214 of rendering the updated live vector glyph. Specifically, updating the vector description with the changes causes the vector editing system 102 to render the live vector glyph with the modified color. For example, the vector editing system 102 can analyze the vector description to display the live vector glyph with the color selected by the user to replace a previous color of the region. The vector editing system 102 can utilize a font layout engine or other component that renders fonts on a remote system (e.g., server device(s) 104 of FIG. 1) or on the client device (e.g., client device 106) for display at the client device of the user in real-time. Thus, the vector editing system 102 can flexibly and efficiently update live vector glyphs in real-time to change colors of selected regions while allowing a user to continue adding, removing, or otherwise modifying live vector glyphs in a text field even after modifying one or more of the live vector glyphs.

Figure 3:
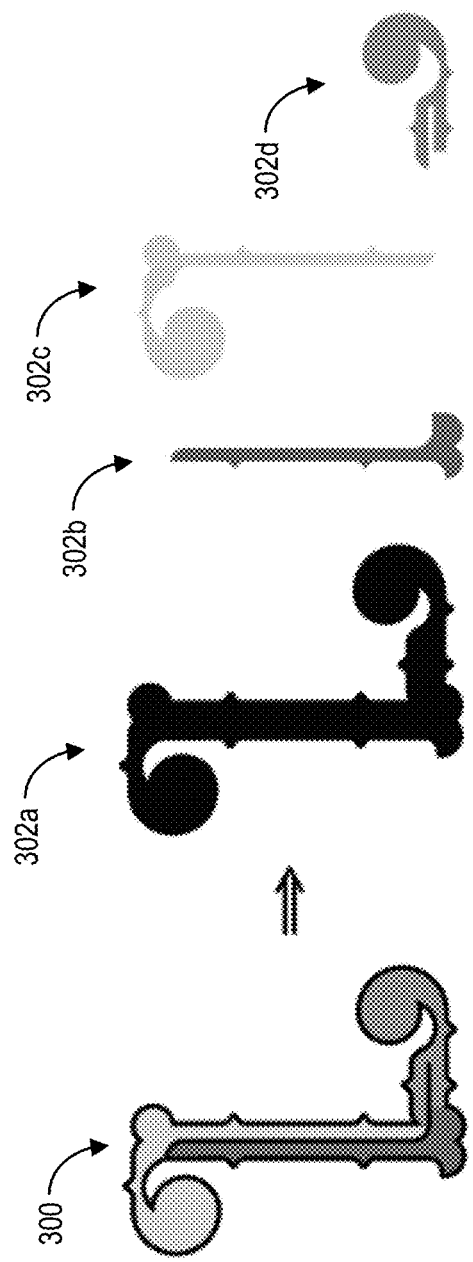
FIG. 3 illustrates a diagram of a live vector glyph including a plurality of regions in accordance with one or more implementations.

As mentioned, vector glyphs can be part of a font set or a collection of glyphs that allows a user to enter a number of different glyphs via a keyboard or other glyph interface. For instance, the vector glyphs can include alphanumerical characters, emoticons, emoji, or other glyphs that a user can enter into a live text/glyph field of a content editing application. To illustrate, FIG. 3 shows a live vector glyph 300 that is a single text character from a font set including a plurality of characters. FIG. 3 also shows a view of each separate region in the live vector glyph 300.

Additionally, the live vector glyph 300 includes a plurality of regions corresponding to a plurality of paths. Each region can be a visually distinguishable area with a region-specific fill color and/or path color. As shown in FIG. 3, the live vector glyph 300 includes a first region 302a, a second region 302b, a third region 302c, and a fourth region 302d that make up different visible areas of the live vector glyph 300. The first region 302a, for example, can include a black color fill that provides a background layer for the text character. The other regions (i.e., second region 302b, third region 302c, and fourth region 302d) are layered on top of the first region 302a with different color fills to provide a certain color aesthetic/theme for the character.

In one or more embodiments, the regions of a live vector glyph can be defined by a path that has the same line color as the color fill (or transparent/no color) such that the regions do not have clearly visible line boundaries/outlines. For instance, as illustrated, the first region 302a has a black color fill with a black line color. Similarly, the other regions in the live vector glyph 300 also have line colors that match the fill colors. Alternatively, one or more regions in a live vector glyph may have a visible boundary/outline that has a visibly different color than the region defined by the path (e.g., a visible outline) depending on the font style, etc.

According to one or more embodiments, the vector editing system 102 allows a user to select any of the regions of the live vector glyph 300 to modify. To illustrate, the vector editing system 102 can allow a user to select the first region 302a to modify a color of the first region 302a. Similarly, a user may select the second region 302b, the third region 302c, and/or the fourth region 302d to modify color(s) of the selected region(s).

FIGS. 4A-4E illustrate a process for modifying a color of a selected region in a live vector glyph based on a user input in accordance with one or more embodiments. Specifically, FIGS. 4A-4E illustrate a process for changing the color of a single region of a live vector glyph by updating style information for a path corresponding to the region. For example, the process includes detecting a selected region, constructing a DOM tree for the live vector glyph, updating path style information for the region to a selected color, and updating the DOM tree for rendering the live vector glyph with the updated color.

Figure 4B:
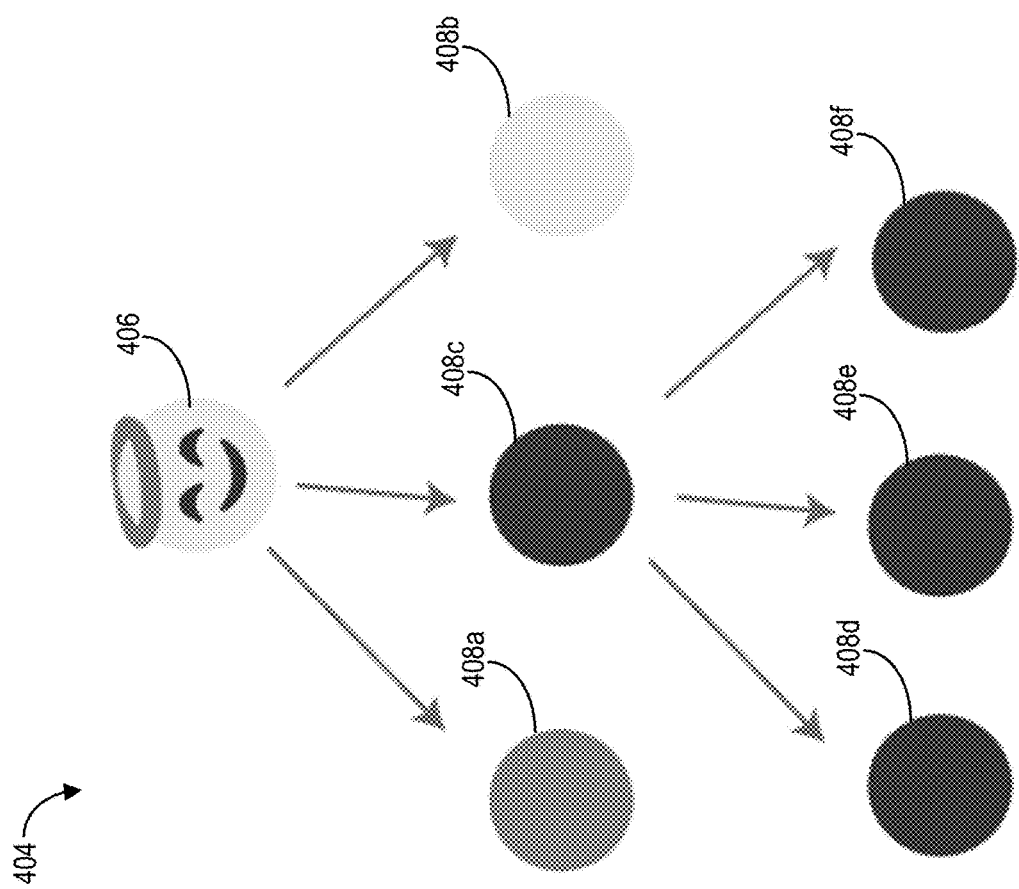
Figure 4A:
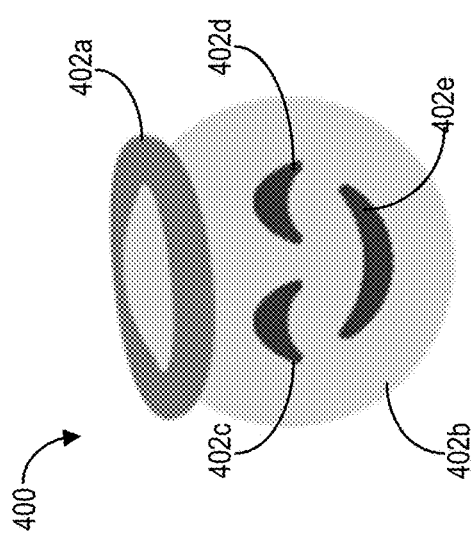

FIG. 4A illustrates a live vector glyph 400 including a plurality of regions with various colors in the plurality of regions. As shown, the live vector glyph 400 includes a Unicode emoji character (i.e., a smiling face with a halo) that a user can enter into a text field (with text characters, other Unicode characters, or no other characters, as may serve a particular implementation). The live vector glyph 400 includes paths that define the different regions of the live vector glyph 400. More specifically, the live vector glyph 400 includes five different paths that define five separate regions.

In one or more embodiments, each of the regions has a color that is specifically assigned to the region. Thus, one or more regions can have different colors or one or more regions may have the same colors. For example, FIG. 4A illustrates that a first path 402a defining a halo of the live vector glyph 400 has a first color fill and a second path 402b defining a face outline for the live vector glyph 400 has a second color fill. Furthermore, a third path 402c and a fourth path 402d defining eyes and a fifth path 402e defining a mouth of the live vector glyph 400 have a third color fill that is different than the first color fill and the second color fill. Accordingly, the eyes and mouth have the same color that is different than the color of the face outline or the color of the halo.

FIG. 4B illustrates a DOM tree 404 that the vector editing system 102 constructs for the live vector glyph 400. In particular, in response to detecting a selection of a region of the live vector glyph 400 (e.g., based on a hit detection of a cursor in the region), the vector editing system 102 can parse a vector description of the live vector glyph 400 used to render the live vector glyph 400 on a display device of a user client device. The vector editing system 102 can generate the DOM tree 404 by identifying the paths in the live vector glyph 400 and then generating nodes based on the paths and their corresponding colors.

To illustrate, the vector editing system 102 can generate a root node 406 that includes the live vector glyph 400 indicating that the DOM tree 404 corresponds to the live vector glyph 400. The vector editing system 102 can then generate child nodes including paths and/or color information for the paths. The DOM tree 404 for the live vector glyph 400 includes a first child node 408a that corresponds to the first path 402a, a second child node 408b that corresponds to the second path 402b, and a third child node 408c that corresponds to the third path 402c, the fourth path 402d, and the fifth path 402e.

Additionally, as shown in FIG. 4B, the third child node 408c represents the color shared by paths 402c-402e. Thus, any paths in the live vector glyph 400 that are associated with the color of the third child node 408c are connected to the third child node 408c. Accordingly, the third child node 408c is a parent node to nodes 408d, 408e, 408f corresponding to the paths 402c-402e. The resulting DOM tree 404 includes a structure that represents the paths and corresponding colors (or other attributes) of the paths from the live vector glyph 400.

After determining the DOM tree 404 for the live vector glyph 400, the vector editing system 102 can extract and modify path style information for a selected region. In particular, the vector editing system 102 can generate a stylesheet from the DOM tree 404 to store path style information for the plurality of paths. FIG. 4C illustrates a stylesheet 410 for the live vector glyph 400. The stylesheet 410 includes a plurality of mappings between the regions of the live vector glyph 400 and colors corresponding to the paths in the live vector glyph 400. For example, the stylesheet can include a row for each path including a path identifier and a color (or other style) corresponding to the path.

To modify a color of a region in the live vector glyph 400, the vector editing system 102 identifies the path corresponding to a selected region based on the path identifiers in the stylesheet 410. To illustrate, in response to determining that a user has selected the region for the second path 402b to modify the color of the second path 402b, the vector editing system 102 can identify the second path 402b in the stylesheet 410 based on the corresponding path identifier. The vector editing system 102 can extract a color from the stylesheet 410 corresponding to the path identifier of the second path 402b. The vector editing system 102 can then change the color of the second path 402b to a selected color by storing the selected color with the path identifier of the second path 402b in the stylesheet 410 (e.g., from yellow to green).

The vector editing system 102 can use the updated stylesheet 410 to update the DOM tree 404 for the live vector glyph 400. FIG. 4D illustrates the DOM tree 404 for the live vector glyph after updating the color for the identified path 402b. As shown, the vector editing system 102 has updated the node 408b for the second path 402b by assigning the node 408b the selected color. Additionally, the vector editing system 102 is able to update the color for the second path 402b without modifying the nodes for the other paths.

After updating the DOM tree 410 with the selected color, the vector editing system 102 can generate a new vector description. Specifically, the vector editing system 102 can generate a new document markup for the live vector glyph 400 that includes the updated color information for the identified path. In one or more embodiments, the vector editing system 102 updates only nodes that have been modified in the new vector description. For instance, the vector editing system 102 can generate new code (e.g., XML code) that includes a description of the live vector glyph 400 (or a portion of the code that includes the description of the live vector glyph 400) for rendering on the display device of the user client device. Additionally, for a non-color vector glyph, the vector editing system 102 can generate a vector description for partial coloring of the non-color vector glyph to cause devices to display the vector glyph with the selected regions colored.

FIG. 4E illustrates an updated live vector glyph 412 with the colors updated according to the user selection of the region with a user-selected color. In particular, to render the updated live vector glyph 412 on a display device, the vector editing system 102 can register the new vector description with a font engine. Registering the new vector description with the font engine causes the font engine to render only the current instance of the vector glyph with the updated color without modifying additional instances of the same vector glyph.

Because the updated live vector glyph 412 is still a live glyph, the vector editing system 102 can allow the user to enter new live vector glyphs in the same text field. In one or more embodiments, the vector editing system 102 allows for further modifications to the updated live vector glyph 412. To illustrate, a user can select the same region or another region of the updated live vector glyph 412 to change a color (or size or other font characteristic). Additionally, the vector editing system 102 can allow the user to delete the updated live vector glyph 412 from the text field and replace it with another live vector glyph.

In at least some embodiments, the vector editing system 102 can retain color change information for a live vector glyph in the case of deletion of the live vector glyph. For example, if a user deletes the updated live vector glyph 412 after modifying a color of one of the regions, the vector editing system 102 can retain the stored color from the stylesheet 410 in a temporary storage. The vector editing system 102 can then apply the stored color from the stylesheet 410 to a new live vector glyph entered into the text field in place of the updated live vector glyph 412. To illustrate, the vector editing system 102 can automatically detect a path in the new live vector glyph that corresponds to the selected region of the updated live vector glyph 412 based on a color theme of the font/character set containing the live vector glyph 400. The vector editing system 102 can then modify the path of the new live vector glyph to the selected color.

Figure 5:
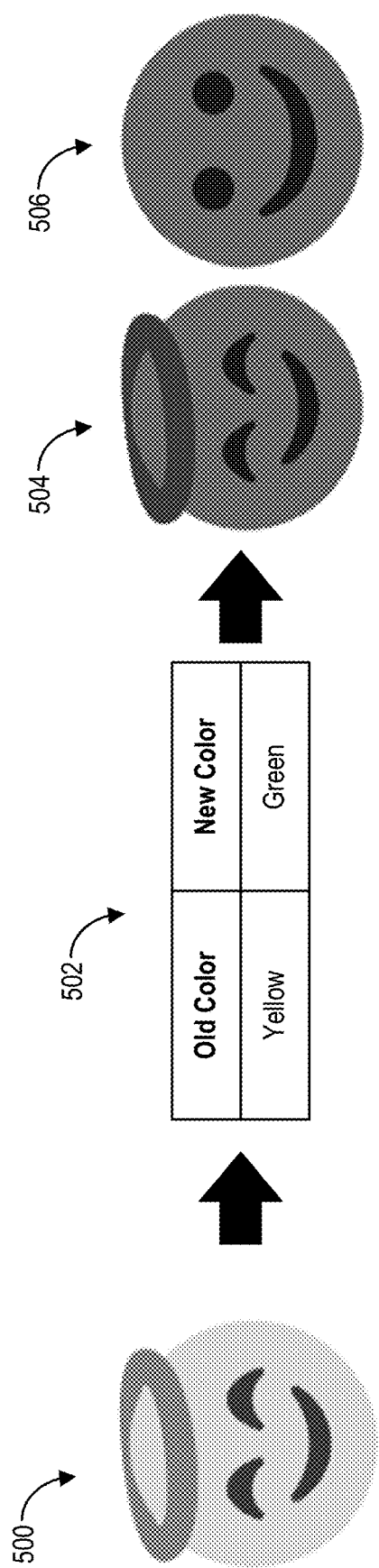
FIG. 5 illustrates a diagram of a process for mapping a color of one or more live vector glyphs to a selected color in accordance with one or more implementations.

In one or more embodiments, the vector editing system 102 allows users to apply a color change to more than one live vector glyph. For instance, the vector editing system 102 can apply a color change to a plurality of live vector glyphs by storing a mapping between a current color (e.g., a default color) and a selected color. FIG. 5 illustrates a process for applying a selected color to a plurality of live vector glyphs using a mapping. By storing a mapping for applying a selected color, the vector editing system 102 can apply a color change to a plurality of existing live vector glyphs or live vector glyphs yet to be entered into a text field.

FIG. 5 illustrates a live vector glyph 500 including a plurality of regions defined by a plurality of paths. Additionally, FIG. 5 illustrates a mapping 502 between an existing color ("Old Color") and a selected color ("New Color"). FIG. 5 also illustrates a plurality of live vector glyphs (a first updated live vector glyph 504 corresponding to the live vector glyph 500 and a second updated live vector glyph 506) after applying the mapping to change the existing color in each of the live vector glyphs to the selected color.

As shown, the live vector glyph 500 includes a default/original color (e.g., "Yellow") for a face region defined by a path. A user can select the region to indicate a desire to change the default color to a selected color (e.g., "Green"). For instance, as described in more detail below with respect to FIG. 8, the user may manually select the region by clicking on the region with a mouse cursor or tapping on the region via a touchscreen. Selecting the region can also cause the vector editing system 102 to detect the default color in the region by constructing a DOM tree for the live vector glyph 500.

Additionally, the user can indicate a replacement color to which the vector editing system 102 changes the old color in any live vector glyphs within the same text field. For example, the user can manually select the color (e.g., from a color wheel or other color selection interface element) or by detecting the color in a vector glyph, an image, or an image element. In response to determining a selected color for modifying the selected region of the live vector glyph 500, the vector editing system 102 can store the selected color in the mapping 502 with the default/original color of the region. In one or more embodiments, the vector editing system 102 stores the mapping 502 with a stylesheet in connection with a text field or document containing the live vector glyph 500. Accordingly, the vector editing system 102 can store the mapping 502 (e.g., as long as the text field or document includes live vector glyphs or beyond).

After generating the mapping 502 between an old color and a new color, the vector editing system 102 can apply the new color mapping to the live vector glyph 500 and additional live vector glyphs entered into the text field with the live vector glyph 500. For instance, FIG. 5 illustrates an updated live vector glyph 504 after the user has selected a replacement color by changing the color in a DOM tree for the live vector glyph 500. Additionally, the vector editing system 102 can modify a second live vector glyph 506 entered into the same text field after changing the modifying the live vector glyph 500. Specifically, if the second live vector glyph 506 includes the same color that is replaced by the selected color in the live vector glyph 500, the vector editing system 102 can automatically replace the old color with the selected color in the second live vector glyph 506. Furthermore, as the user adds or deletes live vector glyphs from the text field, the vector editing system 102 can continue automatically modifying the inserted live vector glyphs based on the mapping.

In one or more embodiments, client applications render vector glyphs with different orientations than how the vector glyphs are stored (e.g., in a font dictionary). For instance, a user can insert a vector glyph into a text field with a non-default location or orientation. In such cases, the vector editing system 102 can perform a transformation of the vector glyph into a cache space for path detection and modification of the vector glyph. After modifying the vector glyph, the vector editing system 102 can then transform the vector glyph back to the user space for rendering.

Figure 6:
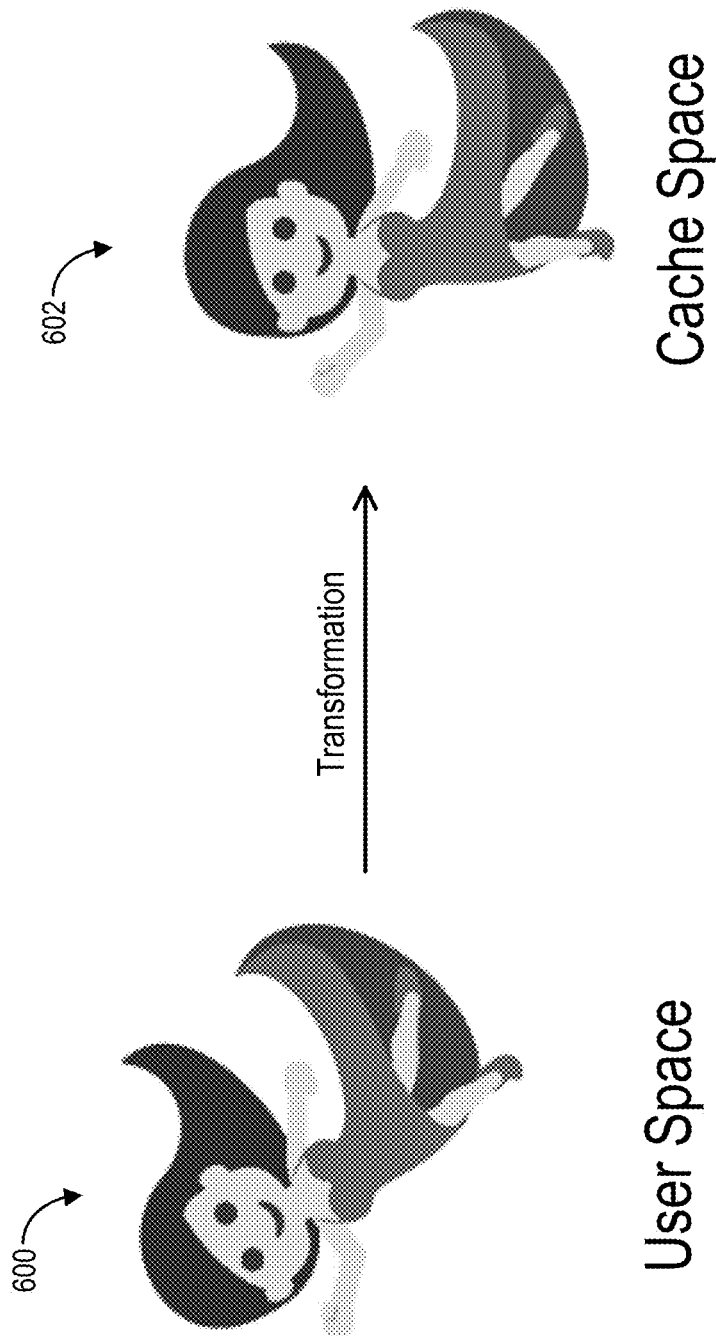
FIG. 6 illustrates a diagram of a process for transforming a live vector glyph between a user space and a cache space in accordance with one or more implementations.

In particular, FIG. 6 illustrates a process for transforming a live vector glyph 600 in a user space to a stored vector glyph 602 in a cache space to perform modifications and then transforming back to the user space. In one or more embodiments, the vector editing system 102 first determines a selected region based on a user input. For instance, if the user manually selects a region, the vector editing system 102 can use hit testing of a mouse cursor (or touchscreen input, etc.) to determine the live vector glyph 600 corresponding to the coordinates of the hit location in the user space. Thus, if a client application includes a plurality of glyphs, including other live vector glyphs in the same text field as the live vector glyph 600, the vector editing system 102 can accurately determine that the user selected the live vector glyph 600.

The vector editing system 102 can then use the hit location to determine the path identifier for the selected region. In particular, the vector editing system 102 can obtain the vector description (e.g., from a font engine) for a glyph identifier corresponding to the live vector glyph 600. The vector editing system 102 can also store the vector description in a cache storage for future reference. The vector editing system 102 can store the vector description in a temporary memory storage, for example, to allow the vector editing system 102 to modify the live vector glyph 600.

After storing the vector description, the vector editing system 102 can translate the location of the hit location into cache space relative to the live vector glyph 602 (also in the cache space). Specifically, the vector editing system 102 can transform the hit location to the cache space to identify a region based on the coordinates of the hit location in the user space. Because the live vector glyph 602 in the cache space may be rotated differently than the live vector glyph 600 in the user space, performing a transformation to cache space allows the vector editing system 102 to accurately and efficiently determine a region corresponding to a hit location without also having to pass the vector description each time the user interacts with the live vector glyph 600 in the user space.

In response to determining the hit location in the cache space, the vector editing system 102 can determine a path identifier for the corresponding region in the cache space. In particular, the vector editing system 102 can parse the vector description to determine the DOM tree for the live vector glyph 602 in the cache space and traverse the DOM tree to identify the corresponding path identifier. Based on the path identifier, the vector editing system 102 can then extract a color for the path based on path style information for the path identifier in a stylesheet corresponding to the live vector glyph 602 in the cache space. After extracting the color from the path style information in the stylesheet, the vector editing system 102 can update the color for the path identifier in the stylesheet with a selected color.

The vector editing system 102 can then use the updated stylesheet to modify the live vector glyph 602 in the cache space. For instance, as previously described, the vector editing system 102 can update the DOM tree with the selected color for the path and then generate a new vector description. Additionally, the vector editing system 102 can then transform the live vector glyph 602 back to the user space with the updated color information and render the live vector glyph 600 with the correct rotation in the user space.

Figure 7A:
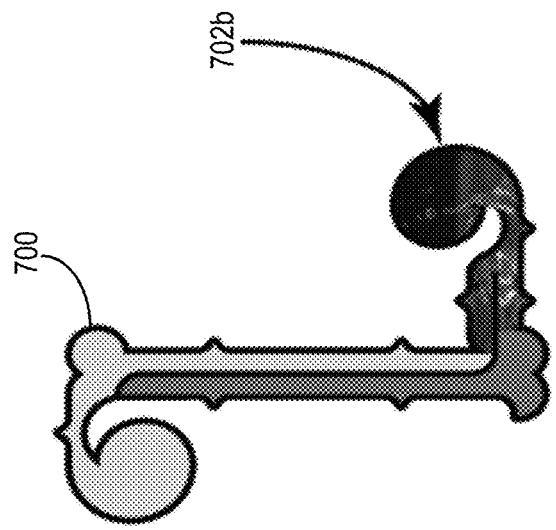
FIGS. 7A-7B illustrate diagrams of a live vector glyph including a gradient or a pattern in a region in accordance with one or more implementations.
Figure 7B:
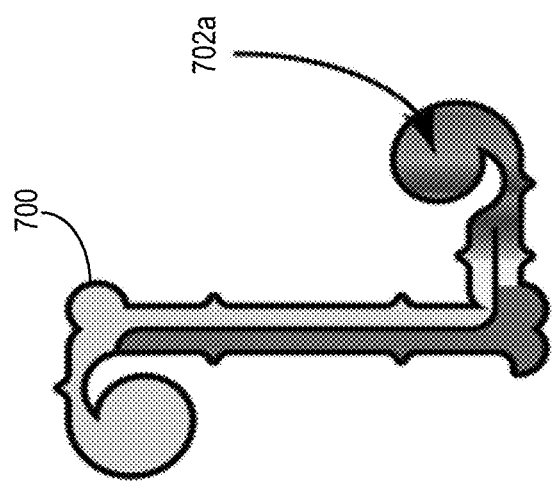

In addition to changing a color of a region of a live vector glyph to a solid color, the vector editing system 102 can allow a user to apply gradients or textures to live vector glyphs. In particular, FIG. 7A illustrates a live vector glyph 700 including a region 702*a* with a gradient replacing an original color for the region 702*a*. FIG. 7B illustrates the live vector glyph 700 including a region 702*b* with a texture replacing an original color for the region 702*b*. To illustrate, the vector editing system 102 can replace a color in path style information for a region with a gradient (e.g., by replacing a color in a stylesheet with an identifier for a stored gradient style). Similarly, the vector editing system 102 can replace a color in path style information for a region with a texture or image (e.g., by replacing a color in a stylesheet with an identifier, filename, or pointer for the texture or image). Thus, the vector editing system 102 allows a user to set various color, gradient, texture, or image fills (e.g., images selected by a user of a client device) of paths/regions in live vector glyphs while maintaining the glyphs as live glyphs.

Figure 8:
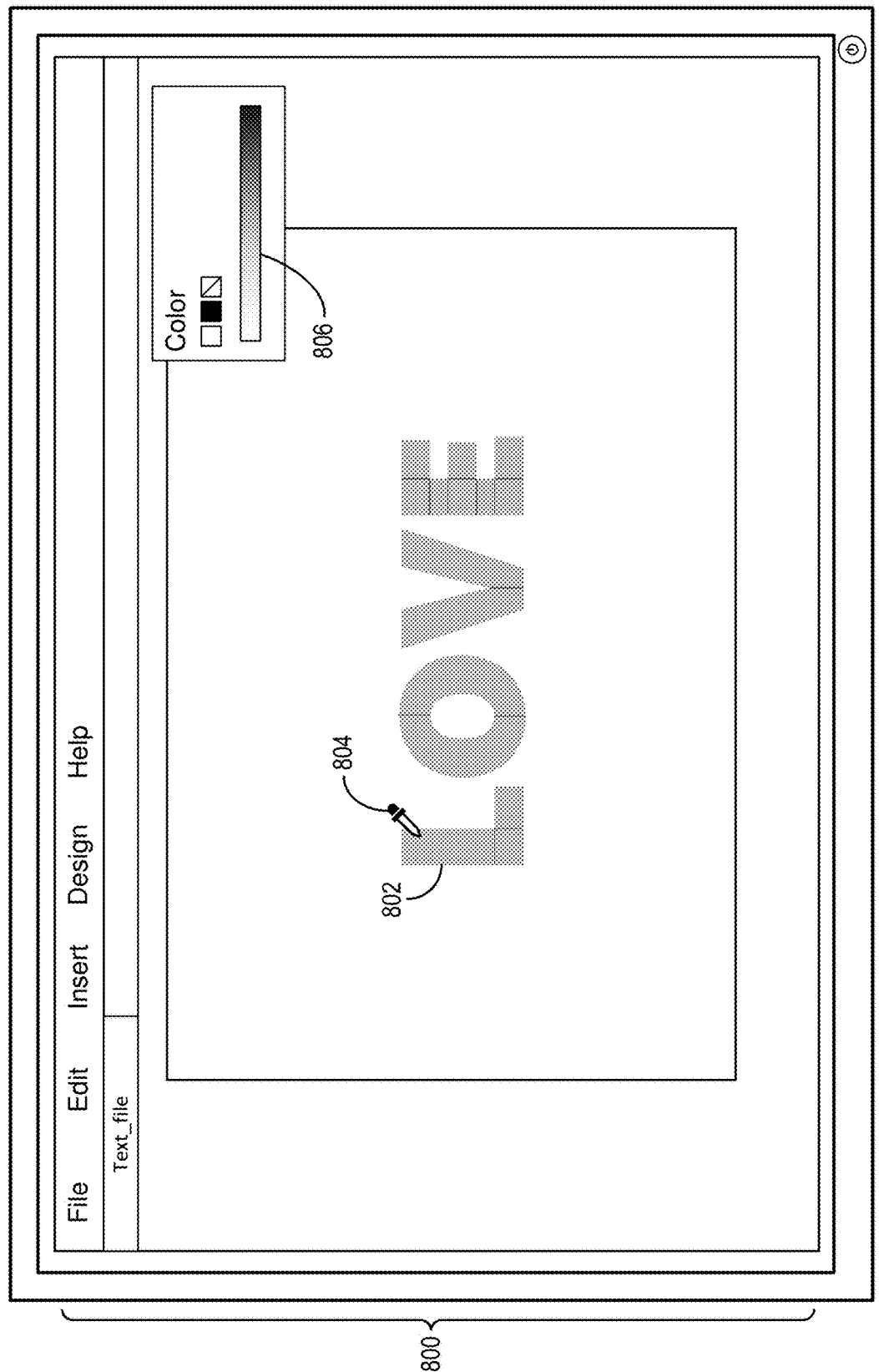
FIG. 8 illustrates a diagram of a graphical user interface of a user interface tool for selectively modifying a color of a region of a live vector glyph in accordance with one or more implementations.

In one or more embodiments, the vector editing system 102 allows users to manually modify individual regions of live vector glyphs. FIG. 8 illustrates a graphical user interface 800 of a client application for modifying a region of live vector glyph separately from other regions of the live vector glyph or of other live vector glyphs. In particular, FIG. 8 illustrates the use of a user interface tool to select a color and a region of a live vector glyph to apply the selected color to the selected region.

For example, the client application can include a digital content editing application for generating, importing, and modifying vector digital content such as vector images and vector text/glyphs. To illustrate, a user can enter one or more live vector glyphs into a text field of the graphical user interface 800. The client application can enter the live vector glyphs into the user interface 800 by accessing a font dictionary to obtain glyphs based on an input by a user. Furthermore, the client application can allow a user to input, delete, copy, paste, and modify characteristics (e.g., size) of the live vector glyphs using one or more interface tools.

In one or more embodiments, to modify a color of a region of a live vector glyph 802, a user utilizes a user interface tool such as a color dropper tool 804. For example, the user can select the color dropper tool 804 from a plurality of tools (e.g., a tool menu). The user can use the color dropper tool 804 to select a color from a color selection element 806 (or another vector element within the user interface 800). The user can then use the color dropper tool 804 to select a region of the live vector glyph 802 and apply the selected color from the color selection element 806 to the selected region. By using the color dropper tool 804, the vector editing system 102 can apply the selected color to a single region of a single live vector glyph without modifying any of the other regions and/or live vector glyphs.

Figure 9A:
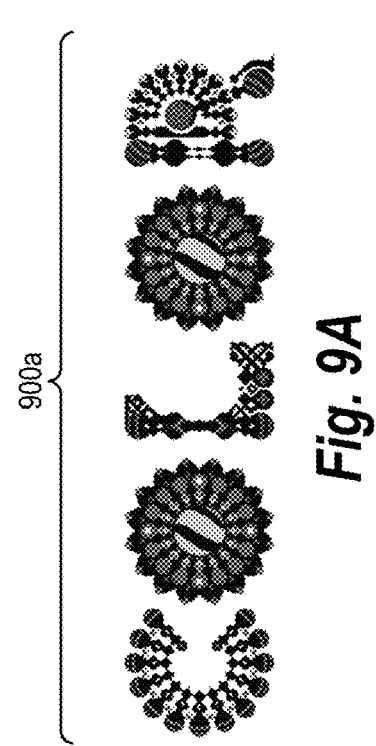
FIGS. 9A-9C illustrate diagrams of a process for mapping colors of a plurality of live vector glyphs in accordance with one or more implementations.
Figure 9B:
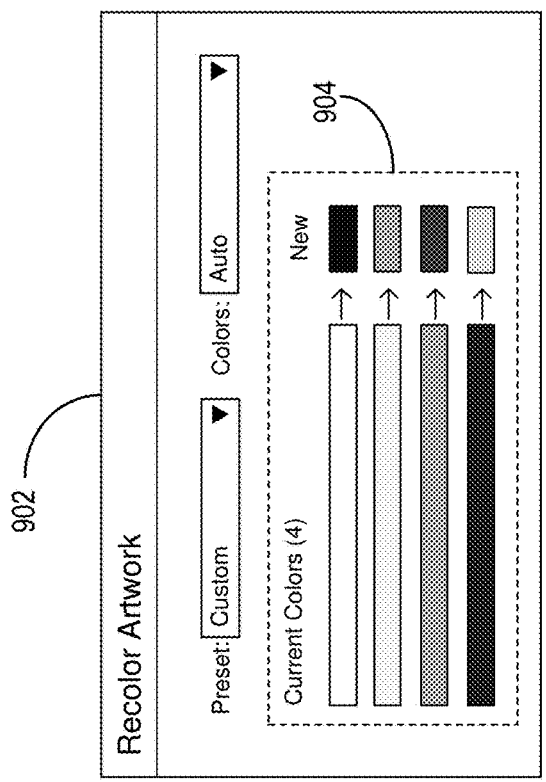
Figure 9C:
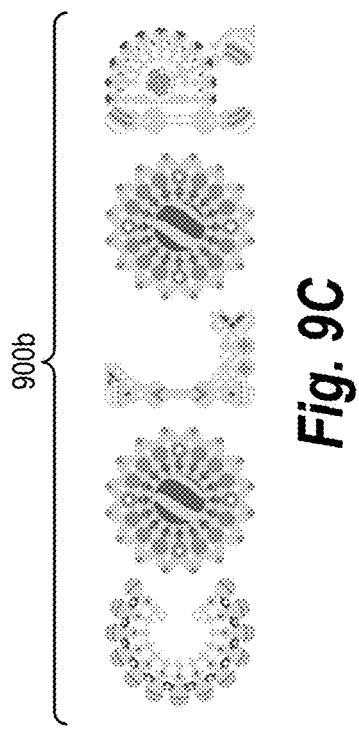

In one or more alternative embodiments, the vector editing system 102 allows a user to recolor a plurality of regions across a plurality of live vector glyphs. FIGS. 9A-9C illustrate a process for modifying a plurality of colors of a set of live vector glyphs with a user interface tool. To illustrate, FIG. 9A illustrates a plurality of live vector glyphs 900a having a variety of colors according to a predetermined color theme for the vector glyphs. FIG. 9B illustrates a user interface dialog 902 that allows a user to modify a plurality of identified colors in the predetermined color theme. FIG. 9C illustrates the plurality of live vector glyphs 900b having an updated color theme based on user inputs in the user interface dialog of FIG. 9B.

As mentioned, FIG. 9A illustrates a plurality of live vector glyphs 900a having a predetermined color theme. In particular, the live vector glyphs 900a each have a plurality of regions that include a plurality of different colors. As shown, each vector glyph includes a large number of regions of a variety of sizes conforming to the predetermined theme. More specifically, each region in each live vector glyph includes a color from the predetermined color theme.

To modify the predetermined color theme, the vector editing system 102 provides the user interface dialog 902, as shown in FIG. 9B. The user interface dialog 902 can include theme tools 904 for viewing and modifying a current theme of the plurality of live vector glyphs 900a. For instance, the theme tools 904 can include color interface elements displaying the current colors in the predetermined color theme and selectable elements that allow a user to change a certain color in the predetermined color theme to another color (e.g., via a color selection element, such as a color wheel).

When the user selects a new color to replace a color the predetermined color theme, the vector editing system 102 identifies the paths in the plurality of live vector glyphs 900a that are associated with the color being replaced. Specifically, the vector editing system 102 can identify the paths in stylesheets for the plurality of live vector glyphs 900a based on path identifiers corresponding to the color being replaced. Additionally, the vector editing system 102 can update all of the identified paths with the replacement color (e.g., using a mapping and/or by editing the stylesheets themselves). The vector editing system 102 can thus update a plurality of regions across a plurality of live vector glyphs by modifying colors for the regions simultaneously while maintaining the glyphs as live glyphs. FIG. 9C illustrates live vector glyphs 900b with an updated color scheme.

Figure 10:
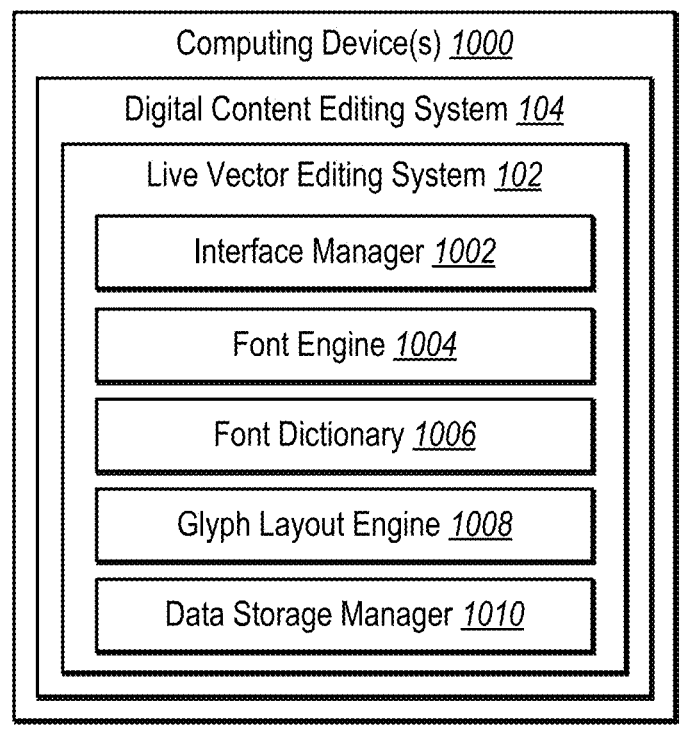
FIG. 10 illustrates a diagram of the live vector editing system of FIG. 1 in accordance with one or more implementations.

As described in relation to FIGS. 1-9C, the vector editing system 102 can perform operations for selectively modifying live vector glyphs. FIG. 10 illustrates a detailed schematic diagram of an embodiment of the live vector editing system 102 described above. As shown, the vector editing system 102 can be implemented within a digital content editing system 104 on computing device(s) 1000 (e.g., a client device and/or server device as described in FIG. 1 and as further described below in relation to FIG. 12). Additionally, the vector editing system 102 can include, but is not limited to, an interface manager 1002, a font engine 1004, a font dictionary 1006, a glyph layout engine 1008, and a data storage manager 1010. The vector editing system 102 can be implemented on any number of computing devices. For example, the vector editing system 102 can be implemented in a distributed system of server devices for providing digital content editing to any number of client devices. Alternatively, the vector editing system 102 can be implemented on a single computing device such as a single client device running a client application that performs digital content editing.

In one or more embodiments, each of the components of the vector editing system 102 is in communication with other components using any suitable communication technologies. Additionally, the components of the vector editing system 102 can be in communication with one or more other devices including other computing devices of a user, server devices (e.g., cloud storage devices), licensing servers, or other devices/systems. It will be recognized that although the components of the vector editing system 102 are shown to be separate in FIG. 10, any of the subcomponents may be combined into fewer components, such as into a single component, or divided into more components as may serve a particular implementation. Furthermore, although the components of FIG. 10 are described in connection with the vector editing system 102, at least some of the components for performing operations in conjunction with the vector editing system 102 described herein may be implemented on other devices within the environment.

The components of the vector editing system 102 can include software, hardware, or both. For example, the components of the vector editing system 102 can include one or more instructions stored on a computer-readable storage medium and executable by processors of one or more computing devices (e.g., the computing device(s) 1000). When executed by the one or more processors, the computer-executable instructions of the vector editing system 102 can cause the computing device(s) 700 to perform the vector editing operations described herein. Alternatively, the components of the vector editing system 102 can include hardware, such as a special purpose processing device to perform a certain function or group of functions. Additionally, or alternatively, the components of the vector editing system 102 can include a combination of computer-executable instructions and hardware.

Furthermore, the components of the vector editing system 102 performing the functions described herein with respect to the vector editing system 102 may, for example, be implemented as part of a stand-alone application, as a module of an application, as a plug-in for applications including marketing applications, as a library function or functions that may be called by other applications, and/or as a cloud-computing model. Thus, the components of the vector editing system 102 may be implemented as part of a stand-alone application on a personal computing device or a mobile device. Alternatively, or additionally, the components of the vector editing system 102 may be implemented in any application that allows editing of digital vector content, including, but not limited to ADOBE® ILLUSTRATOR®. "ADOBE," and "ILLUSTRATOR" are registered trademarks of Adobe Systems Incorporated in the United States and/or other countries.

As mentioned, the vector editing system 102 of FIG. 10 includes an interface manager 1002 that facilitates management of content display in a user interface and interactions with content in the user interface. For example, the interface manager 1002 can determine coordinates for displaying digital content on a display device of a client device. Additionally, the interface manager 1002 can determine locations of user interactions and digital content with which a user interacts at the determined locations.

The vector editing system 102 can also include a font engine 1004 to facilitate to analysis and access to glyph information associated with text characters or other font glyphs. For instance, the font engine 1004 can provide outline information of a glyph inside a given font set and other font details to a client device for rendering vector glyphs. Additionally, the font engine 1004 can communicate with the font dictionary 1006 to obtain font sets and information related to fonts. The font engine 1004 can also communicate with the glyph layout engine 1008 to use position information of a glyph in a text field or text object for accurate rendering. The font engine 1004 can further analyze vector descriptions to determine colors and other path style information for use in modifying and rendering vector glyphs.

In one or more embodiments, the font engine 1104 facilitates modification of live vector glyphs. Specifically, the font engine 1104 can modify colors or other path style information associated with live vector glyphs (e.g., in stylesheets and/or DOM trees based on vector descriptions). The font engine 1104 can then use the updated colors or path style information for rendering the live vector glyphs with the modifications. In one or more alternative embodiments, the vector editing system 102 can include one or more additional components (e.g., a separate client application) for performing the modifications based on vector descriptions for live vector glyphs.

Furthermore, the vector editing system 102 can include a font dictionary 1006 to facilitate management of font sets including text characters or other glyphs. The font dictionary 1006 can include a plurality of font with a plurality of glyphs available for entering into text fields. Each font can include a variety of visual characteristics, color schemes, and path layouts, which may be determined by a font creator. Accordingly, the font dictionary 1006 can provide glyphs from one or more font sets to the font engine for analyzing and processing the glyphs for rendering.

Additionally, the vector editing system 102 can include a glyph layout engine 1008 to provide position information of a glyph in a text field for rendering glyphs in a user interface. The glyph layout engine 1008 can also communicate with the font engine 1004 or other components of the vector editing system 102 to obtain glyph geometry information for layout of the text field. This can include relative positioning between glyphs in a text field or other characteristics that cause a client device to render glyphs within a user interface.

The vector editing system 102 also includes a data storage manager 1010 (that comprises a non-transitory computer memory and/or memory device) that stores and maintains data associated with generating, modifying, and rendering vector glyphs. For example, the data storage manager 1010 can store vector descriptions, DOM trees, stylesheets, or other mappings corresponding to generating and modifying digital vector glyphs. The data storage manager 1010 can be maintained on a local client device of a user or on server devices according to one or more implementations.

Figure 11:
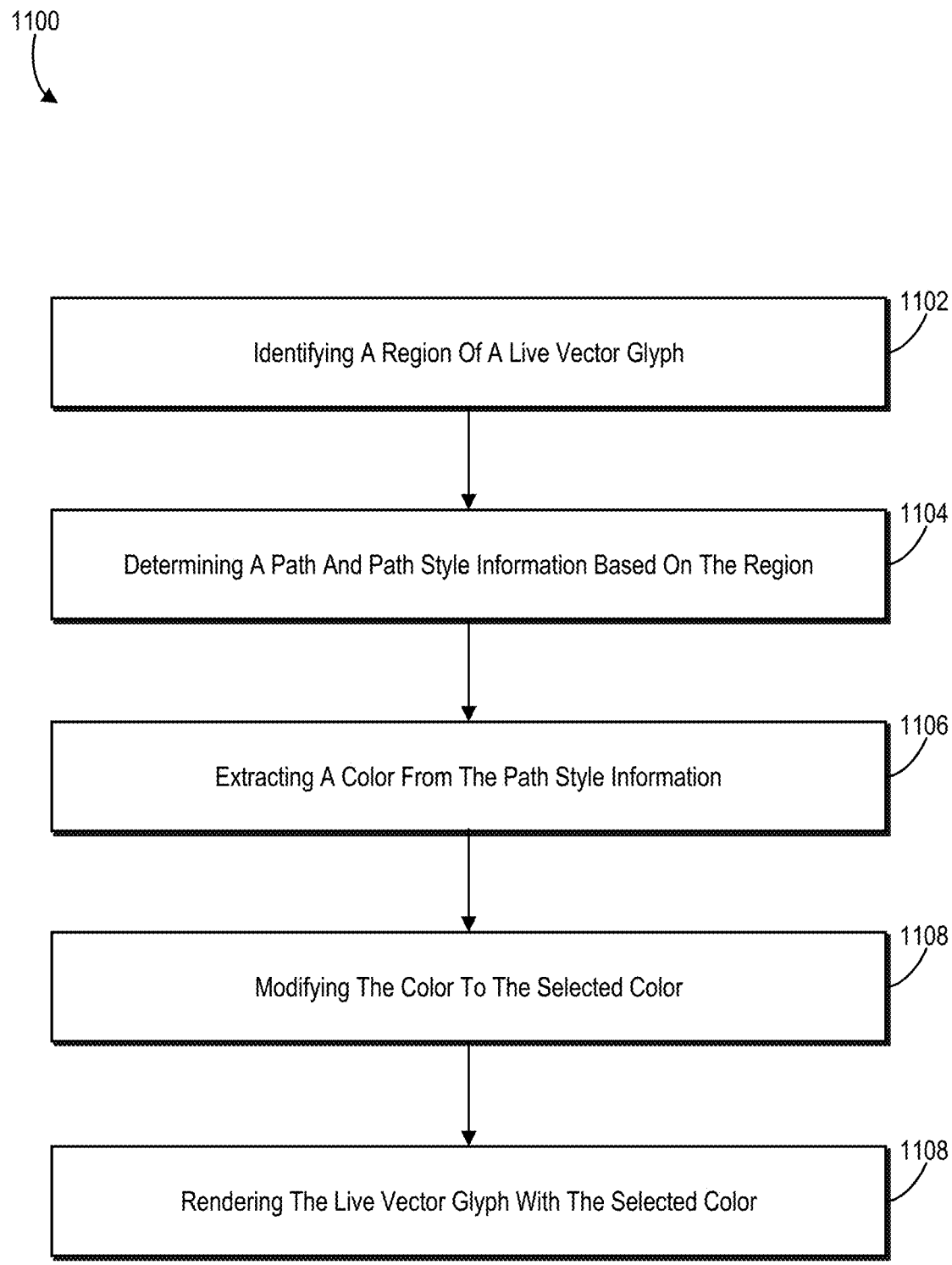
FIG. 11 illustrates a flowchart of a series of acts for selectively modifying vector graphics in accordance with one or more implementations.

Turning now to FIG. 11, this figure shows a flowchart of a series of acts 1100 of selectively modifying vector graphics. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11.

As shown, the series of acts 1100 includes an act 1102 of identifying a region of a live vector glyph. For example, act 1102 involves identifying, for a live vector glyph, a region of a plurality of regions defined by a plurality of paths. For instance, act 1102 can involve detecting a hit location of a cursor within the region using a user interface tool. In one or more embodiments, the user interface tool is a color dropper tool.

Additionally, the series of acts 1100 includes an act 1104 of determining a path and path style information based on the region. For example, act 1104 involves determining, based on the region, a path of the plurality of paths and path style information associated with the plurality of paths from a vector description corresponding to the live vector glyph.

For instance, act 1104 can involve determining the path of the plurality of paths and path style information associated with the plurality of paths from a vector document object model corresponding to the live vector glyph. Act 1104 can involve determining the vector document object model from an initial vector description associated with the live vector glyph. For example, act 1104 can involve parsing the initial vector description to determine the vector document object model. In one or more embodiments, the initial vector description is a document markup.

Act 1104 can involve parsing the vector description to determine a vector document object model comprising the path style information associated with the plurality of paths. Act 1104 can further involve determining, based on the path identifier, the color associated with the path from the path style information.

The series of acts 1100 also includes an act 1106 of extracting a color from the path style information. For example, act 1106 involves extracting, from the path style information, a color associated with the path corresponding to the region. Act 1106 can involve extracting the color from path style information associated with the path corresponding to the region from path style information of a vector document object model. Act 1106 can involve extracting the color from a stylesheet including mappings between path identifiers and colors associated with the plurality of paths, wherein the stylesheet is based on the vector document object model.

Furthermore, the series of acts 1100 includes an act 1108 of modifying the color to the selected color. For example, act 1108 involves in response to identifying a selected color, modifying the color associated with the path to the selected color. Act 1108 can involve replacing the color in the path style information associated with the path with the selected color. For example, act 1108 can involve setting a fill color for the region to the selected color. Additionally, act 1108 can involve setting a line color for the path corresponding to the region to the selected color.

In one or more embodiments, the selected color includes a pattern or a texture. For example, the selected color can include a texture based on a digital image file. Act 1108 can then involve setting the color associated with the path to a pattern or a texture.

Additionally, act 1108 can involve generating a mapping between the color in the path style information for the path to the selected color. Act 1108 can also involve setting, based on the mapping, a color for a path in a subsequent live vector glyph to the selected color.

As part of act 1108, or as an additional act, the series of acts 1100 can include identifying the region based on a user input manually selecting the region with a user interface tool. The series of acts 1100 can then include modifying the color associated with the path to the selected color in response to the user input manually selecting the region.

As part of act 1108, or as an additional act, the series of acts 1100 can include determining, based on the path style information associated with the plurality of paths, a color theme comprising a plurality of colors associated with the plurality of paths of the live vector glyph. The series of acts 1100 can then include providing a color interface element for display within a user interface of a live text editing application of a client device. The series of acts 1100 can also include modifying the color interface element to replace the color associated with the path with the selected color based on a user input to change the color interface element within the user interface.

The series of acts 1100 also includes an act 1110 of rendering the live vector glyph with the selected color. For example, act 1110 involves rendering the live vector glyph with the selected color associated with the path. Act 1110 can involve generating, using modified path style information in a vector document object model corresponding to the live vector glyph, a vector description for the live vector glyph. Act 1110 can then involve rendering the live vector glyph using the vector description based on the modified path style information.

In addition (or in the alternative) to the acts described above, in some embodiments, the series of acts 1100 include performing a step for modifying, based on the region, a color associated with a path of the live vector glyph to the selected color. For instance, the algorithms and acts described in relation to FIGS. 2, 4A-4C, and 5 can provide the corresponding structure for a step for modifying, based on the region, a color associated with a path of the live vector glyph to the selected color.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
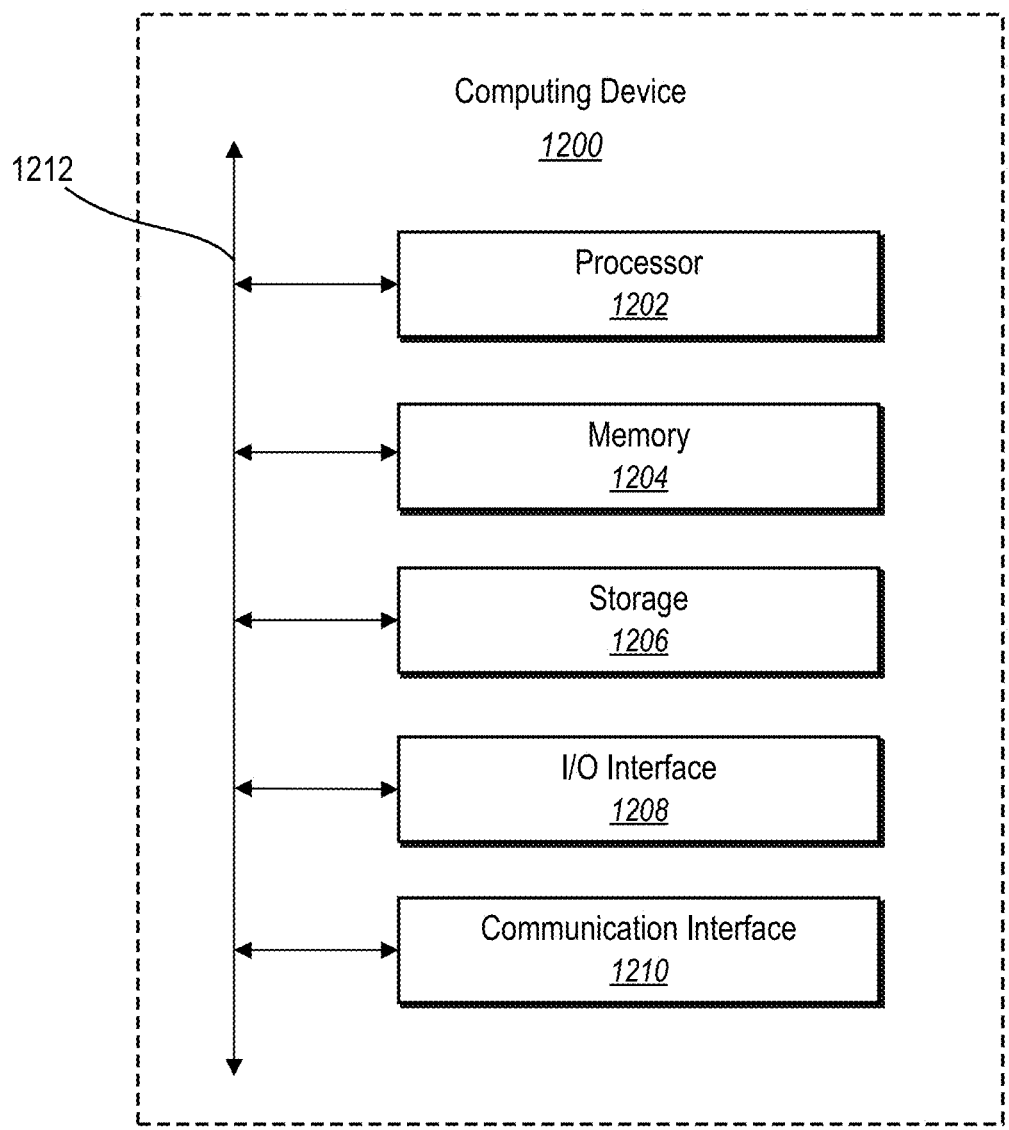
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the vector editing system 102. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for dynamically modifying workflows, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions for performing the methods described herein.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example, and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1210 may facilitate communications with various types of wired or wireless networks. The communication interface 1210 may also facilitate communications using various communication protocols. The communication infrastructure 1212 may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computer system to:
   identify, for a live vector glyph entered as part of a text field in connection with a vector font set comprising the live vector glyph, a region of a plurality of regions defined by a plurality of paths;
   obtain, from a font engine, a vector description corresponding to the live vector glyph within the text field based on the vector font set;
   determine, based on the region, a path of the plurality of paths and path style information associated with the plurality of paths from the vector description corresponding to the live vector glyph within the text field by determining a document object model representation of the live vector glyph based on path identifiers in the vector description;
   extract, from the path style information, a color associated with the path corresponding to the region;
   in response to identifying a selected color, generate updated path style information by modifying the color associated with the path to the selected color; and
   render, via the font engine utilizing the updated path style information, the live vector glyph with the selected color associated with the path within the text field, wherein the text field is modifiable for entering or deleting glyphs within the text field after rendering the live vector glyph with the selected color.

2. The non-transitory computer readable storage medium as recited in claim 1, wherein the instructions that, when executed by the at least one processor, cause the computer system to determine the path of the plurality of paths and the path style information associated with the plurality of paths from the vector description corresponding to the live vector glyph cause the computer system to:
   determine the document object model representation by parsing the vector description to determine a vector document object model comprising the path style information associated with the plurality of paths; and
   determine, based on a path identifier of the path corresponding to the region, the color associated with the path from the path style information.

3. The non-transitory computer readable storage medium as recited in claim 2, wherein the instructions that, when executed by the at least one processor, cause the computer system to modify the color associated with the path to the selected color cause the computer system to replace the color in the path style information associated with the path with the selected color.

4. The non-transitory computer readable storage medium as recited in claim 1, wherein the instructions that, when executed by the at least one processor, cause the computer system to modify the color associated with the path to the selected color cause the computer system to generate a mapping between the color in the path style information for the path to the selected color.

5. The non-transitory computer readable storage medium as recited in claim 4, further comprising instructions that, when executed by the at least one processor, cause the computer system to set, based on the mapping, a color for a path in a subsequent live vector glyph within the text field to the selected color.

6. The non-transitory computer readable storage medium as recited in claim 1, wherein the selected color comprises a pattern or a texture and wherein the instructions that, when executed by the at least one processor, cause the computer system to modify the color associated with the path to the selected color cause the computer system to set the color associated with the path to a pattern or a texture.

7. The non-transitory computer readable storage medium as recited in claim 1, wherein the instructions that, when executed by the at least one processor, cause the computer system to modify the color associated with the path to the selected color cause the computer system to set a fill color for the region to the selected color.

8. The non-transitory computer readable storage medium as recited in claim 1, further comprising instructions that, when executed by the at least one processor, cause the computer system to:
   determine, based on the path style information associated with the plurality of paths, a color interface element comprising a plurality of colors associated with the plurality of paths of the live vector glyph;
   provide the color interface element for display within a user interface of a live text editing application of a client device; and
   modify the color interface element to replace the color associated with the path with the selected color based on a user input to change the color interface element within the user interface.

9. The non-transitory computer readable storage medium as recited in claim 1, further comprising instructions that, when executed by the at least one processor, cause the computer system to:
   identify the region based on a user input manually selecting the region with a user interface tool; and
   modify the color associated with the path to the selected color in response to the user input manually selecting the region.

10. A system comprising:
    at least one processor; and
    a non-transitory computer memory comprising instructions that, when executed by the at least one processor, cause the system to:
    identify, for a live vector glyph entered as part of a text field in connection with a vector font set comprising the live vector glyph, a region of a plurality of regions defined by a plurality of paths;
    obtain, from a font engine, an initial vector description corresponding to the live vector glyph within the text field based on the vector font set;
    determine, based on the region, a path of the plurality of paths and path style information associated with the plurality of paths from a vector document object model corresponding to the live vector glyph within the text field by parsing the initial vector description to determine the vector document object model;

extract, from the path style information of the vector document object model, a color associated with the path corresponding to the region;

in response to identifying a selected color, generate updated path style information by modifying the path style information associated with the path in the vector document object model to set a color of the path as the selected color;

generate, using the modified path style information in the vector document object model, a new vector description for the live vector glyph; and render, via the font engine using the new vector description, the live vector glyph with the selected color associated with the path within the text field, wherein the text field is modifiable for entering or deleting glyphs within the text field after rendering the live vector glyph with the selected color.

11. The system as recited in claim 10, further comprising instructions that, when executed by the at least one processor, cause the system to determine the vector document object model comprising a tree structure with nodes including data indicating the plurality of paths from the initial vector description associated with the live vector glyph.

12. The system as recited in claim 10, wherein the instructions that, when executed by the at least one processor, cause the system to modify the path style information associated with the path in the vector document object model to set the color of the path as the selected color cause the system to generate a mapping between the color in the path style information for the path to the selected color.

13. The system as recited in claim 12, further comprising instructions that, when executed by the at least one processor, cause the system to modify, based on the mapping, a color associated with a path in a subsequent live vector glyph within the text field to the selected color.

14. The system as recited in claim 10, wherein the instructions that, when executed by the at least one processor, cause the system to modify the path style information associated with the path in the vector document object model to set the color of the path as the selected color cause the system to set a fill color for the region to the selected color.

15. The system as recited in claim 10, further comprising instructions that, when executed by the at least one processor, cause the system to:

determine, based on the path style information associated with the plurality of paths, a color interface element comprising a plurality of colors associated with the plurality of paths of the live vector glyph;

provide the color interface element for display within a user interface of a live text editing application of a client device; and modify the color interface element to replace the color associated with the path with the selected color based on a user input to change the color interface element within the user interface.

16. The system as recited in claim 10, further comprising instructions that, when executed by the at least one processor, cause the system to:

identify the region based on a user input manually selecting the region with a user interface tool; and modify the color associated with the path to the selected color in response to the user input manually selecting the region.

17. The system as recited in claim 16, wherein the instructions that, when executed by the at least one processor, cause the system to identify the region based on the user input manually selecting the region with the user interface tool cause the system to:

determine the selected color in response to a user input selecting a color with a color dropper tool; and detect a hit location of a cursor within the region using the color dropper tool.

18. In a digital medium environment for digital graphic design, a computer-implemented method of selectively modifying vector graphics comprising:

identifying, for a live vector glyph entered as part of a text field in connection with a vector font set comprising the live vector glyph, a region of a plurality of regions defined by a plurality of paths;

identifying user input of a selected color;

obtaining, from a font engine, a vector description corresponding to the live vector glyph within the text field based on the vector font set;

determining, based on the region, a path of the plurality of paths and path style information associated with the plurality of paths from the vector description corresponding to the live vector glyph within the text field by determining a document object model representation of the live vector glyph based on path identifiers in the vector description;

extracting, from the path style information, a color associated with the path corresponding to the region;

in response to identifying the user input of the selected color, generating updated path style information by modifying the color associated with the path to the selected color; and rendering, via the font engine utilizing the updated path style information, the live vector glyph with the selected color associated with the path within the text field, wherein the text field is modifiable for entering or deleting glyphs within the text field after rendering the live vector glyph with the selected color.

19. The computer-implemented method as recited in claim 18, further comprising modifying a color of a path of a subsequent live vector glyph within the text field to the selected color based on a color mapping comprising the selected color.

20. The computer-implemented method as recited in claim 19, wherein identifying the region of the plurality of regions defined by the plurality of paths comprises:

determining a color theme comprising a plurality of colors associated with the plurality of paths of the live vector glyph;

provide a color interface element for display within a user interface of a live text editing application of a client device; and identifying, based on a user input interacting with the color interface element, a region corresponding to a color from the plurality of colors in the color interface element.

* * * * *